Sept. 2, 1941. S. E. SCHROEDER Re. 21,895
CLOTHES WRINGER
Original Filed Dec. 13, 1935 4 Sheets-Sheet 1
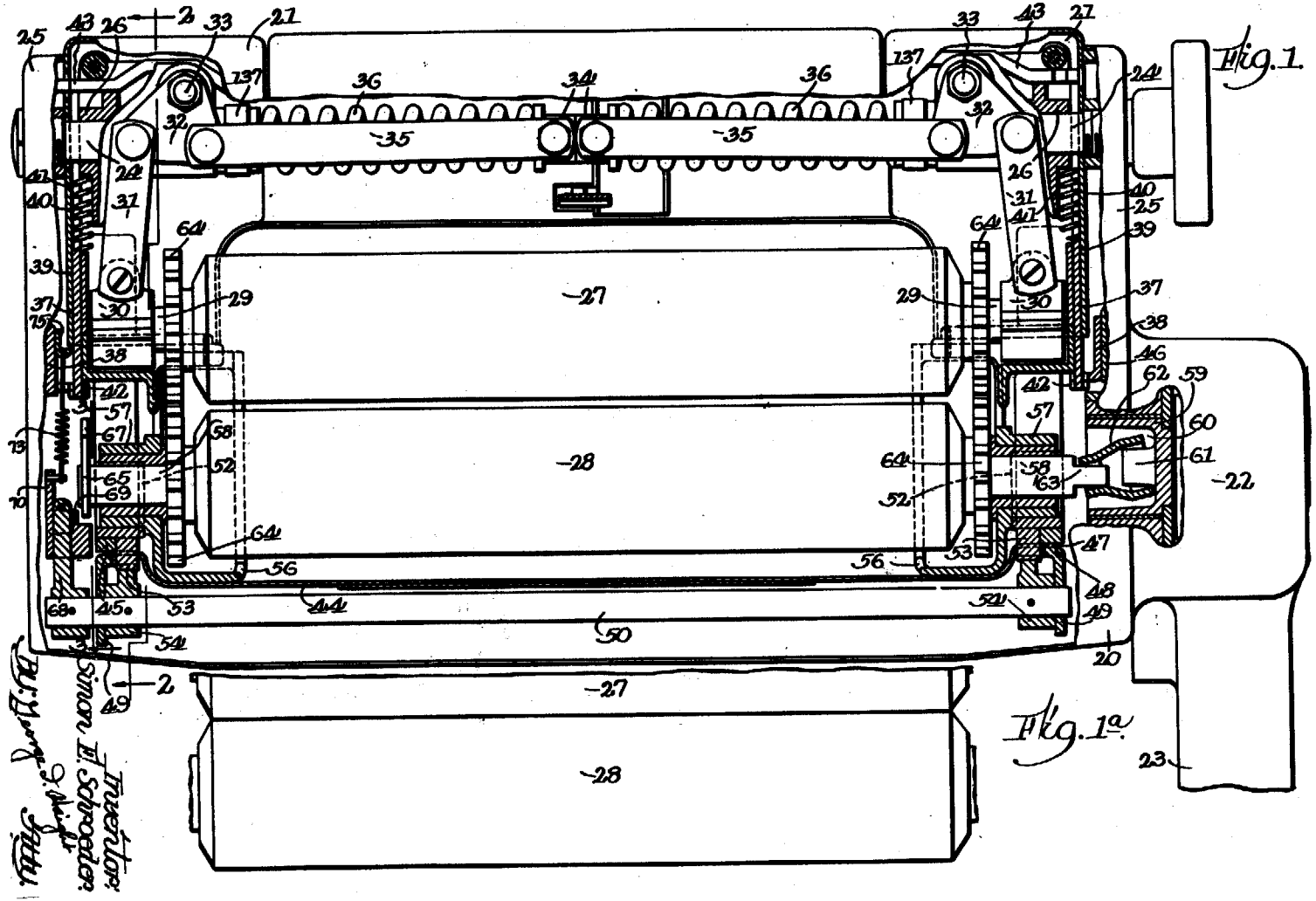

Sept. 2, 1941. S. E. SCHROEDER Re. 21,895

CLOTHES WRINGER

Original Filed Dec. 13, 1935 4 Sheets-Sheet 2

Inventor:
Simon E. Schroeder
By: George D. Haight Atty.

Sept. 2, 1941. S. E. SCHROEDER Re. 21,895
CLOTHES WRINGER
Original Filed Dec. 13, 1935 4 Sheets-Sheet 3
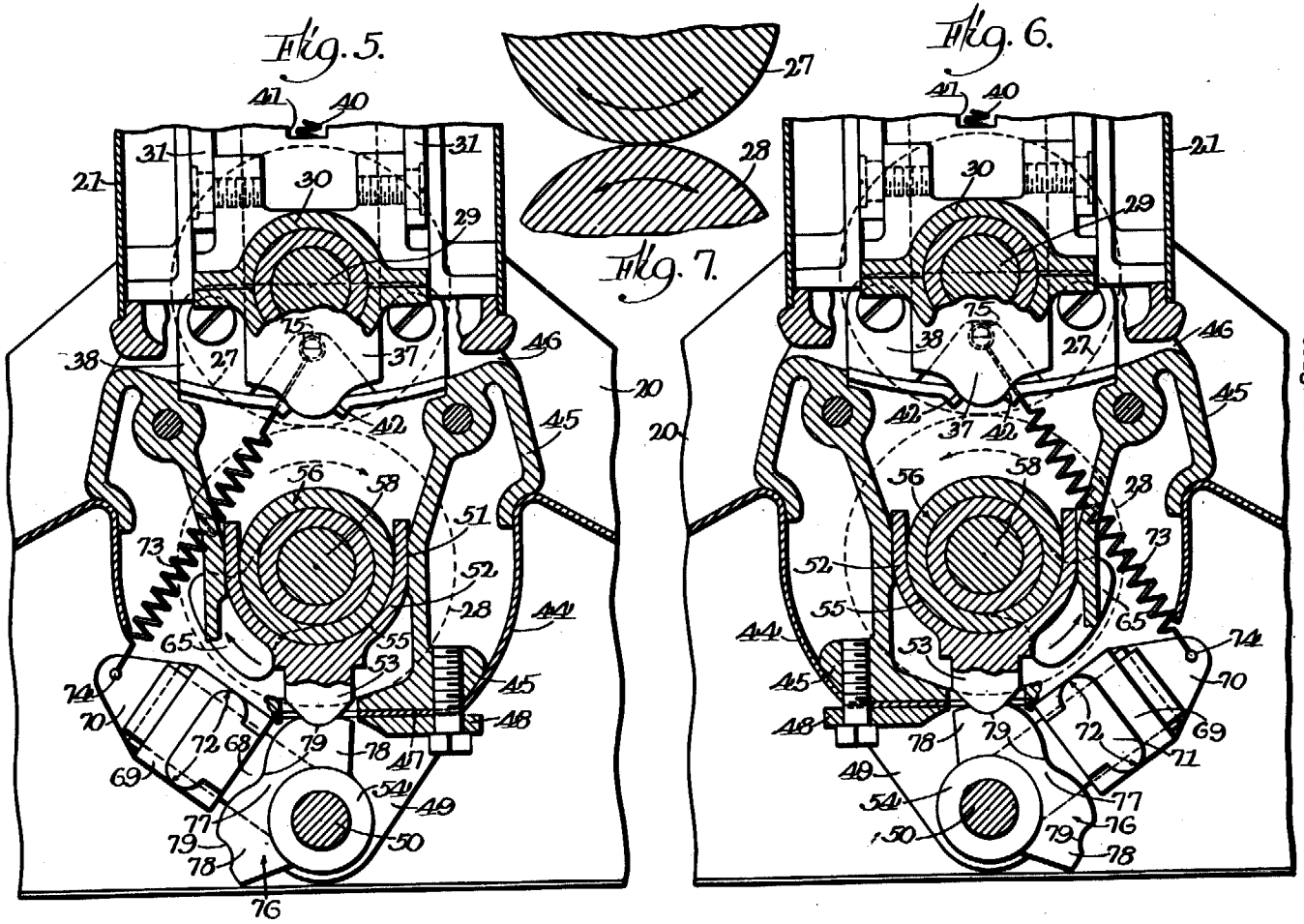
Inventor:
Simon E. Schroeder
By: George D. Haight Atty.

Sept. 2, 1941. S. E. SCHROEDER Re. 21,895

CLOTHES WRINGER

Original Filed Dec. 13, 1935 4 Sheets-Sheet 4

Inventor:
Simon E. Schroeder.
By: George D. Haight Atty.

Reissued Sept. 2, 1941

Re. 21,895

UNITED STATES PATENT OFFICE 21,895

CLOTHES WRINGER

Simon E. Schroeder, Ripon, Wis., assignor to Barlow & Seelig Mfg. Co., Ripon, Wis., a corporation of Delaware Original No. 2,114,404, dated April 19, 1938, Serial No. 54,283, December 13, 1935. Application for reissue April 3, 1940, Serial No. 327,739

32 Claims. (Cl. 68—253)

This invention relates to improvements in wringers, especially adapted for use in connection with power-driven washing machines.

One object of the invention is to provide in a wringer having cooperating power-driven rolls, operating under pressure and adapted to be moved out of operative position with respect to each other to release the rolls from the work, means for automatically displacing one of said rolls when the power as applied to rotate the rolls, to bring the rolls into cooperating pressure relation, said means also operating to automatically retract said roll when the operation of the wringer is stopped to facilitate easy restoration of the rolls to operative position.

Another object of the invention is to provide a wringer having cooperating rolls operating under pressure, wherein one of the rolls is carried by a movable or swinging frame to permit moving said roll away from the other roll to release the mechanism, and wherein means is further provided for automatically projecting one of said rolls toward the other when the power is applied to rotate said rolls, thereby bringing said rolls into pressing relation with each other, said last named means also restoring said roll to its original position when the pressure is released due to displacement of the movable frame, thereby providing clearance between the rolls to facilitate moving the frame to and from its operative position.

A more specific object of the invention is to provide a wringer having cooperating rolls, one of which is carried by a fixed frame and the other by a movable frame adapted to be swung to a position to bring the rolls into operative relation and to be displaced from said operative position to release the pressure between the rolls, a yielding pressure-exerting means for forcing said rolls toward each other arranged and designed so that the frame may be displaced to one side or the other of centered position without disturbing the adjustment of said yielding pressure means, wherein one of said rolls is held in spaced relation to the other roll while the mechanism is idle to provide clearance for said other roll during swinging movement of the frame and wherein said last named roll is automatically projected into operative pressure-transmitting relation with respect to said other roll when the power is applied to rotate said rolls.

Other objects of the invention will more clearly appear from the description and claims hereinafter following.

In the drawings, forming a part of this specification:

Figure 1 is a transverse, vertical sectional view of my improved wringer, certain parts thereof being shown in elevation. Fig. 1[a] is an elevational view, partly broken away, of the cooperating rolls of my improved wringer, said view showing the rolls in engagement with each other.

Figs. 5 and 6 are views similar to Fig. 2, showing the parts in two different positions, said views being broken away at the top and showing the rolls in dotted lines.

Fig. 7 is a vertical, sectional view of the engaging portions of the rolls of the wringer.

Fig. 9 is a view similar to Fig. 7, showing the rolls separated to a position corresponding to that illustrated in Fig. 8.

Fig. 10 is an elevational view of a certain arm and cooperating slide of a cam shaft shown in Figs. 1 to 6 inclusive and 8, the cam shaft being shown in vertical section in Fig. 10.

Fig. 11 is a horizontal, sectional view corresponding substantially to the line 11—11 of Fig. 10.

Figures 2, 3, 4:
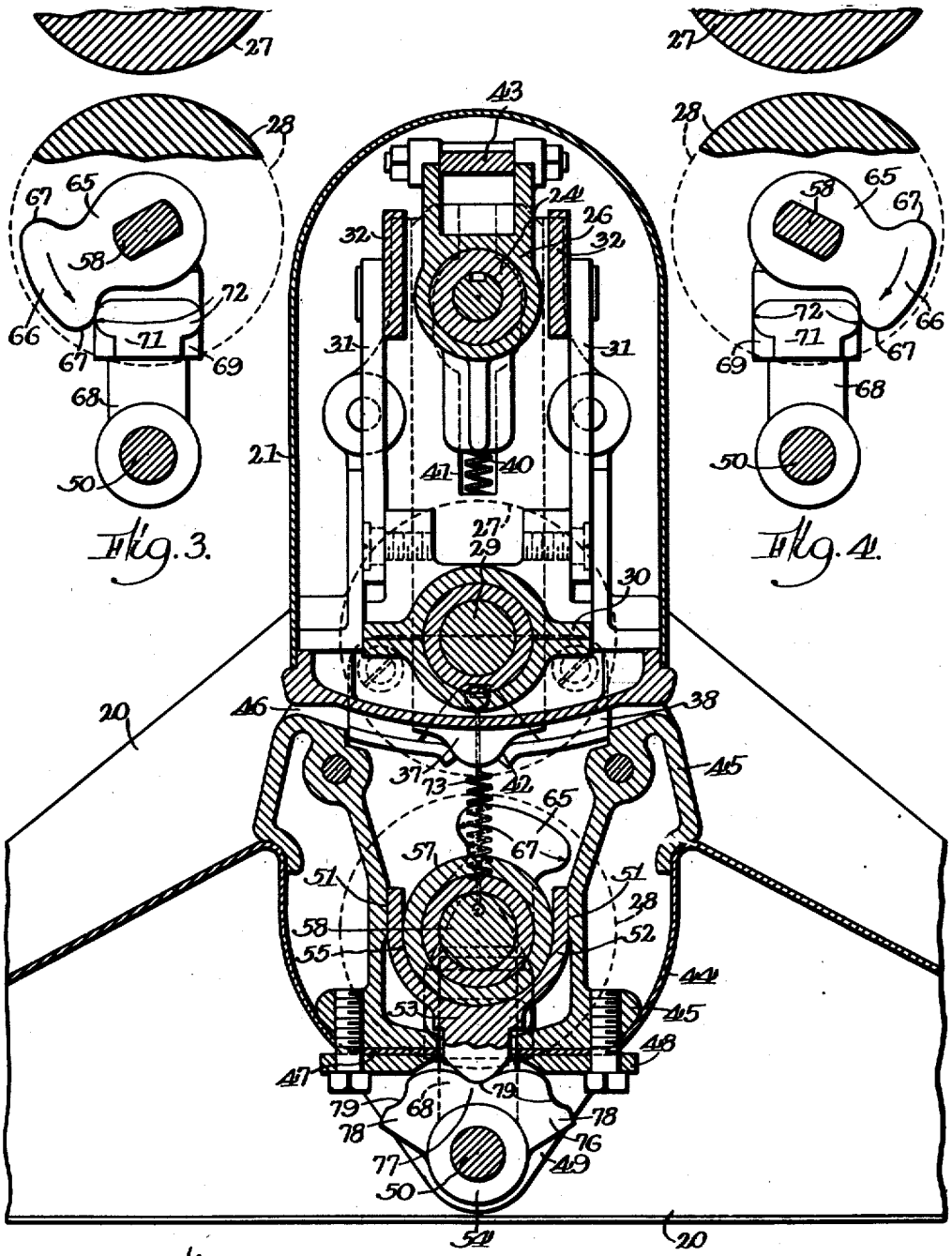
Fig. 2 is a vertical sectional view corresponding to the line 2—2 of Fig. 1, said view showing the positions of the wringer rolls in dotted lines.
Fig. 3 is a vertical, sectional view corresponding substantially to the line 3—3 of Fig. 1, but showing the parts in different positions.
Fig. 4 is a view similar to Fig. 3, showing the parts in still different positions.

In said drawings, 20 indicates the main or bottom frame of the wringer and 21 a swinging frame supported for movement with respect to said main frame. A housing 22, forming a part of the main frame 20, contains power-transmitting gear connections, under control of the operator for starting and stopping rotation of the wringer rolls and driving the same in either right or left-hand direction. The housing 22 has a depending sleeve portion 23 for mounting the wringer on a washing machine. The gear mechanism in the housing 22 is driven by the driving elements of the associated washing machine in the usual well known manner. In this connection, it is pointed out that the sleeve 23 of the housing 22 telescopes over the usual vertically arranged hollow standard of the washing machine having a vertically disposed shaft therein operatively connected to and rotated by the driving elements of said washing machine. This shaft is coupled to the gearing in the housing 22 in any well known manner to impart rotary movement to said gearing.

The swinging frame 21 of the wringer is pivotally supported on inwardly projecting trunnions 24—24 on upstanding arms 25—25 at opposite sides of the main frame 20, the frame 21 being provided with fixed bearing sleeves 26—26 in which the trunnions are journeled.

The top and bottom rolls of the wringer, which are indicated by 27 and 28, are carried respectively by said swinging frame 21 and main frame 20. The roll 27 is fixed on a shaft 29, which projects from opposite ends of the roll and is rotatably journaled in bearing blocks 30—30. The bearing blocks 30—30 are suspended in the frame 21 in such a manner that downward movement of the same and the roll 27 supported thereby is limited, and that upward movement thereof is yieldingly opposed. The mechanism for thus mounting the bearing blocks 30—30 and the roll 27 forms the subject matter of my copending application, Serial No. 54,284, filed December 13, 1935, now Patent No. 2,198,462 granted April 23, 1940 and is fully described therein. Briefly, this mechanism comprises links 31—31 pivotally connected at their lower ends to the bearing blocks 30—30; triangular lever plates 32—32, to the lower corners of which the upper ends of the links 31—31 are pivoted; pivot members 33—33 on which the lever plates swing, said pivot members being fixed to the frame 21; followers 34—34 connected to the inner lower corners of the lever plates 32—32 by links 35—35; and springs 36—36 interposed between the followers 34—34 and spring abutments 137—137. As will be seen, the spring followers 34—34 engage with each other, thereby limiting movement thereof, and through the links 35—35, lever plates 32—32, and links 31—31 limiting downward displacement of the bearing, blocks 30—30 and the roll 27 carried thereby. Inasmuch as the springs 36—36 yieldingly resist separation of the followers 34—34, these springs yieldingly oppose upward movement of the rolls through the connections formed by the links 35—35, levers 32—32, and links 31—31 with the bearing blocks 30—30 of said roll 27.

The swinging frame 21 is normally held in centered position with respect to the main frame 20 by latch means comprising latch plates 37—37 on the frame 21 cooperating with keepers 38—38 fixed to the side arms of the main frame 20. The latch plates 37—37 are guided for vertical movement in guideways 39—39 in the frame 21 and are forced outwardly or downwardly by springs 40—40 seated in pockets 41—41 in said frame 21 to yieldingly engage with seats 42—42 of the keepers 38—38. The latch plates 37—37 are normally locked in projected position in engagement with the seats 42—42 of the keepers 38—38 by releasable locking means including a slide bar 43 engaging the upper ends of the plates. The means for locking the swinging frame 21 in centered position, comprising the latch plates 37—37, the keepers 38—38, and the releasable locking means including the slide bar 43, forms the subject matter of my copending application, Serial No. 54,282, filed December 13, 1935, and is fully described therein, and therefore needs no further detailed description in connection with the present application. However, it might be pointed out that, as disclosed in said last named copending application, the means for releasing the latch means is designed to be actuated at will by the operator or automatically actuated when the wringer rolls become jammed, so that the frame 21 may be swung to either side of centered position to effect separation of the rolls to release the same. As further described in said last named copending application, provision is also made for automatically stopping rotation of the rolls by means actuated through displacement of the frame to either side of its centered position.

The main frame 20 has a troughlike portion 44, which contains the bottom roll 28. At opposite ends of the trough 44, supports 45—45 are provided, which are fixed to the main frame 20. Each support 45 forms a part of a casting 46 fixed to the corresponding side wall of the frame 20. The lower ends of the supports 45—45 abut flat bottom wall portions 47—47 provided at opposite ends of the trough 44, as most clearly shown in Fig. 2. Supporting brackets 48—48 are secured to the bottom wall portions 47—47 of the trough 44, said brackets having depending flanges 49—49 provided with openings in which a cam shaft 50, hereinafter more fully described, is journaled. As most clearly shown in Figs. 2 and 8, the brackets 48—48 are held in place by screws extending through horizontal top flanges on the brackets and through the bottom wall sections 47—47 of the trough 44 into the supports 45—45. Each support 45 has a vertically arranged guideway 51, in which is mounted for vertical movement a slide 52. Each slide 52 has a depending stem portion 53 loosely extending through aligned openings in the bottom of the support 45, the bottom wall of the trough 44, and the horizontal flange of the corresponding bracket 48. The bottom end of the stem of each slide 52 is tapered, as shown in Figs. 2, 5, 6, and 8, and is provided with a rounded extremity adapted to cooperate with a cam member 54 fixed to the corresponding end of the cam shaft 50. Each slide 52 has a curved seat 55.

As shown in Fig. 1, rocking guard members 56—56 are provided at opposite sides of the main frame 20, which serve to guide and direct the material operated on through the wringer. Each guard member 56 is provided with a sleeve-like bearing section 57, which is supported in the seat 55 of the corresponding slide 52.

The bottom roll 28 is mounted on and fixed to a shaft 58, which projects from opposite ends of the roll and is rotatably journaled in the bearing bushings in the sleeves 57—57 of the guard members 56—56. As shown most clearly in Fig. 1, the ends of the shaft 58 project beyond the outer ends of the corresponding sleeves 57—57. The bottom roll 28 is driven by the gearing contained in the housing 22 of the main frame 20, the hub portion of the driven gear member of said gearing being shown in Fig. 1 and indicated by 59. Said hub portion 59 is provided with a central pocket 60 having a driving lug 61 of angular cross section projecting from the inner wall thereof. The right-hand end of the shaft 58 of the roll 28 is operatively connected to the lug 61 by means of a coupling sleeve 62, which is telescoped over said lug 61 and a portion 63 of square cross section at the corresponding end of the shaft 58, the interior of the coupling sleeve 62 being of angular cross section to correspond with the lug 61 and the end portion 63 of the shaft 58, thereby forming a driving connection between the shaft and the hub 59 of the gear hereinbefore referred to.

The coupling sleeve 62 loosely fits the lug 61 and the portion 63 of the shaft 58 so as to form a flexible connection between these parts, which permits the roll 28 to be raised or lowered while being driven through the driving gear mechanism of the wringer. The two rolls 27 and 28 are intergeared so that rotation is imparted from the roll 28 to the roll 27. Gears 64—64 and 64—64 are provided for this purpose, said gears being fixed respectively to the shafts 29 of the top roll 27 and 58 of the bottom roll 28.

An arm 65 is fixedly mounted on the projecting end of the shaft 58 at the left-hand side of the mechanism, as shown in Fig. 1, said arm rotating with the roll 28 and actuating the cam shaft 50, as hereinafter more fully described. As shown most clearly in Figs. 1 to 6 inclusive and 8, the arm 65 is provided with a laterally enlarged head portion 66 at the outer end thereof having rounded opposite end portions 67—67.

As shown most clearly in Fig. 1, the cam shaft 50 has a radially extending arm 68 fixed to the left-hand end portion thereof. A slide block 69 is movably mounted on said arm 68. The slide block 69 is provided with an upstanding section 70 projecting beyond the outer end of the arm 68. On the side of the slide adjacent to the left-hand end of the shaft 58, as shown in Fig. 1, a lateral enlargement 71 is provided, which is of substantially the shape shown most clearly in Fig. 10. The enlargement 71 forms a head member having rounded portions 72—72 at opposite sides thereof. The enlargement or head 71 is in alignment with the arm 65 at the end of the shaft 58 of the roll 28 so that when the parts are in the position shown in Figs. 1, 2, and 8, the head 71 will be in the path of movement of the head portion 66 of the arm 65. A tension spring 73 connected at the lower end to a pin 74 fixed in the outer end of the section 70 of the slide block 69 and anchored at its upper end to a hook-shaped lug 75 on the corresponding side wall of the main frame 20 serves to exert an upward pull on said slide block 69. A pin extending through the outer end of the arm 68 limits the outward movement of the slide block 69 with respect to said arm. The spring 73 exerts a pull at all times to restore the arm 68 to the central position shown in Figs. 2 and 8 whenever the arm is swung to either side of said centered position.

The cam members 54—54 which are disposed at opposite end portions of the cam shaft 50, are respectively arranged immediately below the downwardly extending stems 53—53 of the slides 52—52 which support the bottom roll 28. Each cam member 54 has a hub section, which is secured to the shaft 50 by means of a pin or any other equivalent securing element and is provided with a radially extending, fan-shaped, cam plate section 76, which has a low cam portion 77 at the center thereof and high cam portions 78—78 at opposite sides of said low cam portion. As shown most clearly in Figs. 2, 5, 6, and 8, the high cam portions 78—78 and said low cam portion 77 are provided with seats or notches 79—79—79, which cooperate with the rounded lower extremity of the stem 53 of the corresponding slide 52. The notched arrangement of the cam members 54—54 by cooperation with the ends of the stems 53—53 of the slides 52—52 provides for holding the cam members 54—54 in adjusted position as long as pressure is exerted on the bottom roll 28 of the wringer.

Figure 8:
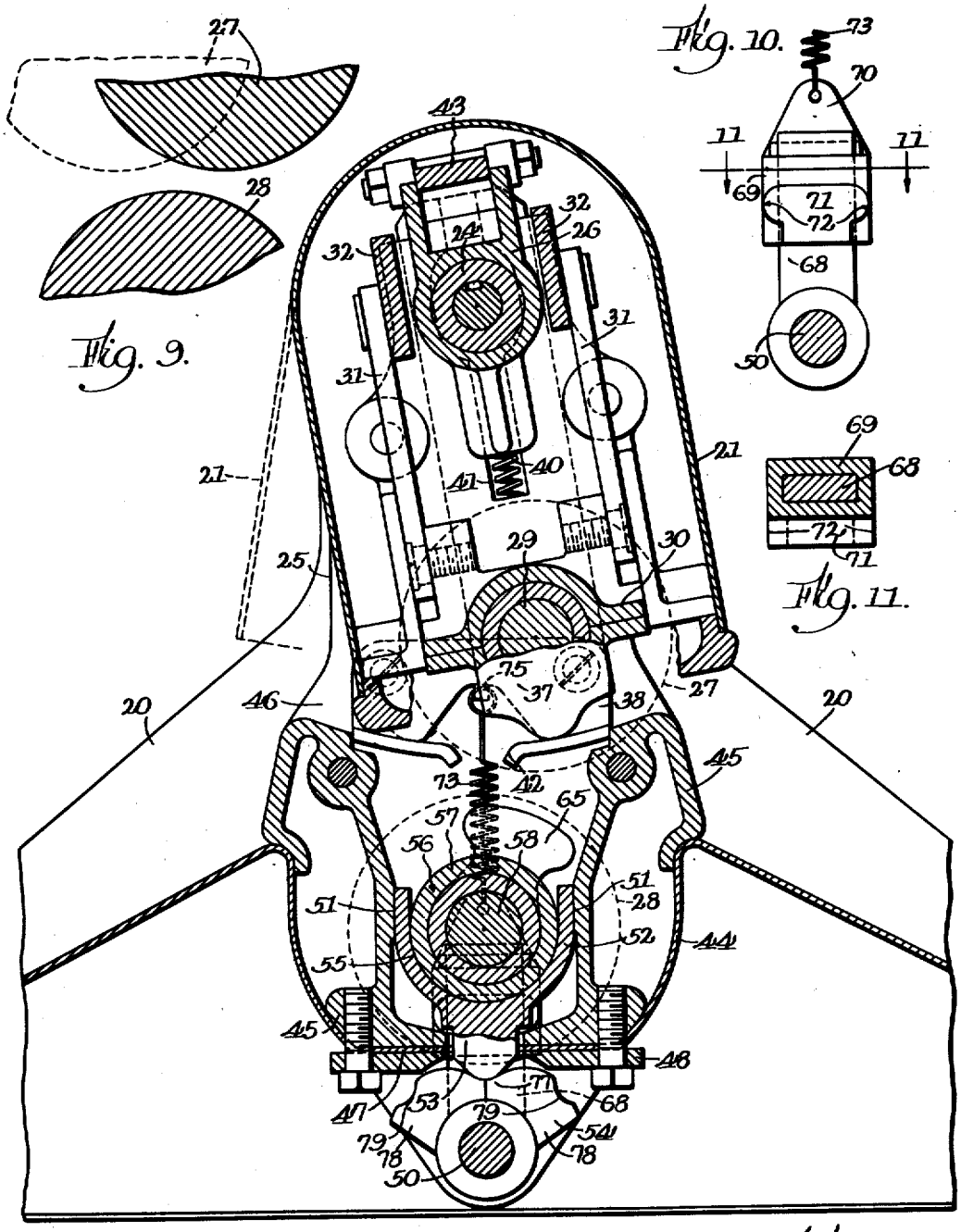
Fig. 8 is a view similar to Fig. 2, showing in full lines the swinging carrier for the top roll displaced to one side of centered position and indicating in dotted lines the carrier when displaced to the other side of said centered position.

When the cam members 54—54 are in the position shown in Figs. 1, 2, and 8, with the low portions of the cam members in engagement with the lower ends of the stems 53—53 of the slides 52—52, the bottom roll 28 is supported in spaced relation with respect to the top roll 27. This is the condition of the parts after the pressure between said rolls has been removed. Assuming that the operation of the wringer is started and rotation imparted to the roll 28, the arm 65 which rotates with said roll will engage the head portion 71 of the slide block 69 on the arm 68 of the cam shaft 50, thereby swinging said arm to one side or the other of the centered position, depending upon the direction of rotation of the roll 28. As shown in Fig. 5, when the roll 28 is rotated in a clockwise direction, the slide block 69, together with the arm 68, is swung to the left, thereby turning the cam shaft 50 and bringing the cam members 54—54 to the position shown in Fig. 5 with the high cam portions 78—78 thereof in engagement with the stems 53—53 of the slides 52—52, thereby lifting the slides together with the roll 28 and bringing the bottom roll 28 in pressure-exerting relation with the top roll 27. In Fig. 6, the roll 28 is shown rotated in a contraclockwise direction, thereby swinging the arm 68 in a reverse direction to that shown in Fig. 5 and rotating the cam members to bring the other high cam portions 78—78 into operative engagement with the slides 52—52 to raise the latter and lift the roll 28, as hereinbefore described. As will be seen, when the arm 68 is swung to either side of the centered position, as shown in Figs. 5 and 6, the spring 73 will be tensioned, thereby exerting a pull on said arm tending to return the same to the centered position. However, as long as pressure is exerted between the rolls 27 and 28, the rounded lower ends of the stems 53—53 of the slides 52—52 will remain securely seated in the notches of the high cam portions 78—78, thereby locking the cam shaft 50 and the arm 68 thereof against movement. When this pressure is removed through separation of the top roll 27 from the bottom roll 28, the force of the spring 73 is sufficient to effect disengagement of the rounded end portions of the stems 53—53 of the slides 52—52 from the notches 79—79 of the high cam portions 78—78 of the cam members 54—54 and swing the arm 68 to the centered position shown in Figs. 2 and 8, thereby bringing the low cam portions 77—77 of the cam members 54—54 into position beneath the stems 53—53 of the slides 52—52, thus lowering the slides and the roll 28 carried thereby to the position shown in Figs. 1, 2, and 8. Should the arm 65 not be clear of the path of swinging movement of the head 71 of the slide 69 of the arm 68, the rounded portions of the heads 66 and 71 will ride over each other, the yielding connection provided by the spring 73 permitting inward sliding movement of the slide 69 on the arm 68. It is further pointed out that should the arm 65 be in a depending position when the roll 28 is being lowered, the arm 68, together with the slide 69, will strike the arm 65 and move it aside, the free condition of the roll 28 permitting this action. In the operation of my improved wringer, the pressure between the rolls 27 and 28 is removed by separating the rolls through swinging movement of the frame to either side of the centered position, as shown in full lines and indicated by dotted lines in Fig. 8. This removal of the pressure renders operative the mechanism for restoring the cam members 54—54 to centered position, as hereinbefore described.

In the normal operation of the wringer, the rolls 27 and 28 are in pressure-exerting relation, as shown in Figs. 1a, 5, 6, and 7. In case it is found desirable, or necessary in an emergency, to release the rolls of the wringer from operative engagement with each other, the latch mechanism comprising the plates 37—37 and the keepers 38—38 of the frames 21 and 20 respectively is released by the operator in the manner described in my copending applications hereinbefore referred to, thereby permitting the swinging frame 21 to be swung to either side of the centered position through the reactive force between the rotating gears 64—64 and 64—64 of the rolls 27 and 28. As has also been pointed out in said copending applications, the locking means is also released automatically through jamming of the wringer rolls. As will be obvious, the frame 21 when unlocked from the frame 20 is free to be swung to either side of the centered position by the operator. The parts of the wringer are reset by manually swinging the frame 21 from either side of the centered position to said centered position, thereby bringing the latch plates 37—37 into latching engagement with the keepers 38—38. Inasmuch as the bottom roll 28 has been previously lowered to the position shown in Figs. 1, 2, and 8, thereby providing clearance for the top roll 27, restoration of the frame 21 to centered position may be easily effected with very little effort as the rolls are not brought into pressure-exerting relation until the bottom roll 28 is again raised by power being applied to rotate the same.

From the preceding description taken in connection with the drawings, it will be seen that I have provided a wringer, the rolls of which may be released from operative pressure engagement with each other without disturbing adjustment of the means which controls the pressure between said rolls while operating on an article, and the parts of which may also be easily restored to normal operative position without disturbing said adjustment.

I have herein shown and described what I now consider the preferred manner of carrying out my invention, but the same is merely illustrative and I contemplate all changes and modifications that come within the scope of the claims appended hereto.

I claim:

1. In a wringer, the combination with a pair of cooperating rolls having shafts; of means for moving one of said rolls toward the other roll; and means driven by one of said roll shafts for actuating said first named means when said rolls are rotated.

2. In a wringer, the combination with a pair of cooperating rolls having shafts; of means for driving said rolls to rotate the same; and means driven by one of said roll shafts for automatically moving one of said rolls toward the other when said rolls are rotated.

3. In a wringer, the combination with a pair of cooperating rotary rolls operating under pressure; of means for holding said rolls engaged in operative position while under pressure; means for displacing one of said rolls from operative pressure position with respect to the other roll; and means automatically operative upon said pressure being removed for effecting withdrawal of said other roll from operative position.

4. In a wringer, the combination with a pair of cooperating rolls having shafts, one of said rolls being displaceable with respect to the other roll; of means for driving one of said shafts to rotate the rolls; means for advancing and retracting the displaceable roll with respect to the other; means driven by one of said roll shafts when said rolls are rotated for operating said second named means to advance said displaceable roll; and means automatically operative upon removal of the pressure between said rolls for actuating said second named means to retract said displaceable roll.

5. In a wringer, the combination with cooperating top and bottom rolls; of means for rotating said rolls; means for supporting said bottom roll in operative pressure relation with said top roll; trip means for displacing said top roll to remove the pressure between said rolls; and means automatically operated upon removal of the pressure between said rolls for withdrawing said supporting means to effect separation of the bottom roll from the top roll.

6. In a wringer, the combination with cooperating top and bottom rolls; of means for rotating said rolls; means cooperating with each of said rolls for holding said rolls in operative pressure-exerting position with respect to each other during rotation of said rolls; manually-actuated trip means for displacing one of said holding means for separating one of said rolls from the other to remove said pressure from said rolls; and means automatically operative upon removal of said pressure for retracting the other holding means to retract the other roll from said operative position.

7. In a wringer, the combination with cooperating top and bottom rolls; of means for rotating said rolls; means operative through rotation of said rolls for moving one of said rolls to pressure-exerting position with respect to the other roll and holding the same in such position; means for releasing said rolls from pressure engagement with each other; and means rendered operative by removal of the pressure between said rolls for retracting said roll-moving means to remove the roll associated therewith from said pressure-exerting position.

8. In a wringer, the combination with cooperating top and bottom rolls; of means for rotating said bottom roll; means for lifting said bottom roll into operative pressure-exerting position with respect to the top roll; means rotatable with said bottom roll for actuating said lifting means to raise said bottom roll; and means automatically operated upon removal of the pressure between said rolls for retracting said lifting means to lower said bottom roll and separate the same from the top roll.

9. In a wringer, the combination with top and bottom rolls; of means for rotating said bottom roll; raising means on which said bottom roll is rotatably supported; means actuated by rotation of said bottom roll for actuating said raising means to bring said bottom roll into pressure-exerting position with respect to the top roll; and means rendered operative upon removal of the pressure between said rolls for actuating said raising means to retract the same and separate said rolls.

10. In a wringer, the combination with a pair of cooperating rolls; of means for rotating said rolls, one of said rolls being displaceable toward and away from the other roll; means for effecting displacement of said last named roll; means actuated by rotation of said displaceable roll for advancing said second named means to move said displaceable roll toward the other roll into pressure-exerting relation thereto; and means automatically operated upon removal of the pressure between said rolls for retracting said second named means to effect separation of said rolls.

11. In a wringer, the combination with a pair of cooperating rolls; of means for rotating said rolls; cam means for advancing one of said rolls toward the other roll; and means operated by rotation of said rolls for actuating said cam means.

12. In a wringer, the combination with a pair of cooperating rolls; of means for rotating said rolls; movable supporting means for one of said rolls; cam means having high and low portions cooperating with said supporting means for effecting movement of the supporting means and the roll carried thereby to advance the same toward and retract the same from the other roll; means operated by rotation of said rolls for actuating the cam means to bring the high portion thereof into operative engagement with the supporting means to advance the same; and means automatically operative upon removal of the pressure between said rolls for bringing the low cam portion into operative engagement with said supporting means to retract the same and separate said rolls.

13. In a wringer, the combination with cooperating top and bottom rolls; of means for rotating said rolls; supporting means for the bottom roll; cam means cooperating with said supporting means for raising and lowering the same; means rotatable with said bottom roll for engaging and actuating said cam means to raise said supporting means and bottom roll; and means rendered operative by removal of the pressure between said rolls for actuating said cam means to lower the supporting means.

14. In a wringer, the combination with cooperating top and bottom rolls; of means for rotating said rolls; oscillatory cam means for raising and lowering said bottom roll; means rotatable with said bottom roll for actuating said cam means to elevate said bottom roll into operative pressure relation with the top roll; means operative through the pressure between said rolls for holding said cam means in position with the bottom roll raised, said holding means being released upon removal of said pressure between said rolls; and means rendered operative by release of said holding means to actuate said cam means to lower said bottom roll and separate same from said top roll.

15. In a wringer, the combination with top and bottom cooperating rolls; of vertically movable supports for said bottom roll; means for rotating said bottom roll; oscillatory cam means for raising and lowering said supports to raise and lower said bottom roll; means actuated by rotation of said bottom roll for oscillating said cam means in one direction to raise said bottom roll into pressure-exerting relation with respect to the top roll; spring means for oscillating said cam means in a reverse direction to lower said bottom roll; and means held in operative engagement with the cam means by the pressure only between said rolls for holding said cam means against reverse movement, said means being released from holding engagement through removal of the pressure.

16. In a wringer, the combination with top and bottom rolls; of means for rotating said bottom roll; vertically movable slides in which said bottom roll is journaled; oscillatory cam members having high and low portions cooperating with said slides to raise and lower the same; an arm rotatable with said bottom roll; lever means for oscillating said cam members, said lever means being in the path of rotary movement of said arm to be actuated in one direction to bring the high cam portions into active engagement with the slides to raise the latter; and spring means for oscillating said cam members in a reverse direction to bring said low cam portions into active engagement with the slides to lower the same.

17. In a wringer, the combination with a pair of cooperating rolls operating under pressure; of means for rotating said rolls; a fixed support for one of said rolls; a movable support for the other of said rolls, said movable support being movable away from the fixed support to separate said rolls to release the pressure therebetween, one of said rolls being displaceable with respect to its support; means for advancing and retracting said displaceable roll with respect to its support to respectively bring said rolls into operative pressure relation and effect separation thereof; means actuated by rotation of said rolls for operating said second means to advance said displaceable roll into operative pressure relation with the other roll; and means automatically operative upon removal of the pressure between said rolls by separation of said rolls through movement of said movable support away from the fixed support, for actuating said second named means to retract said displaceable roll.

18. In a wringer, the combination with a pair of cooperating rolls; of means for rotating said rolls; a fixed support for one of said rolls; a support for the other roll movable with respect to said first named support, one of said rolls being displaceable with respect to its support to bring said roll into operative pressure relation with the other roll; means for holding said displaceable roll in said operative pressure relation with respect to the cooperating roll; and means automatically operated upon removal of the pressure between said rolls by movement of said movable support away from the fixed support for withdrawing said holding means to effect withdrawal of said displaceable roll from said cooperating roll.

19. In a wringer, the combination with a fixed support; of a support movable toward and away from said fixed support; a roll mounted in each support; means for rotating said rolls; yielding pressure-exerting means cooperating with one of said rolls to yieldingly force the same toward the other roll; means for mounting said last named roll for inward and outward displacement with respect to its support toward and away from the cooperating roll; means for limiting movement of the yieldingly supported roll outwardly of its support; means for advancing and retracting said displaceable roll; means actuated by rotation of said rolls for operating said advancing and retracting means to advance the displaceable roll into cooperative pressure-exerting relation with respect to the yieldingly supported roll; and means automatically operated by removal of the pressure between said rolls through movement of said movable support away from the fixed support for actuating said advancing and retracting means to retract said displaceable roll.

20. In a wringer, the combination with a pair of cooperating rolls; of means for rotating said rolls; a fixed frame; a movable frame swingingly supported on said fixed frame; means yieldingly supporting one of said rolls in one of said frames; means for movably supporting the other roll in the other frame for displacement outwardly and inwardly of said frame to advance and retract said roll with respect to said yieldingly supported roll, said pressure being removed when the swinging frame is swung to separate said rolls; and means automatically operated through removal of the pressure between said rolls by displacement of said swinging frame for withdrawing said holding means to retract said displaceable roll.

21. In a wringer, the combination with a pair of cooperating rolls; of means for yieldingly forcing one of said rolls toward the other roll and limiting the movement of said yieldingly forced roll toward said other roll; means for holding said other roll in operative position with said yieldingly forced roll during operation of the wringer; main and auxiliary frames carrying said rolls respectively; means movably supporting one of said frames with respect to the other frame; releasable means for locking said frames together with the rolls in cooperative relation, said last named means when released permitting movement of said movable frame away from the other frame to separate said rolls; and means rendered operative through separation of said rolls upon movement of said movable frame away from the other frame for withdrawing said holding means to release said other roll from operative position.

22. In a wringer, the combination with a pair of cooperating rolls; of means for projecting one of said rolls against the other roll to bring the rolls into cooperative pressure engagement with each other; yielding pressure-exerting means acting on said other roll and yieldingly opposing displacement thereof by said projected roll; and means for actuating said first named means to retract said projected roll, said actuating means being held inoperative by the pressure exerted between said rolls and becoming operative when said pressure is released.

23. In a wringer, the combination with a pair of cooperating rolls; of displaceable means for supporting one of said rolls in operative relation with respect to the other roll; releasable means for locking said supporting means in operative position; pressure-exerting means carried by said displaceable means for maintaining the roll supported by said displaceable means yieldingly projected to engage with said other roll; and means for retracting said other roll from operative engagement with the yieldingly projected roll to provide clearance between said rolls to permit free movement of said supporting means to locked position.

24. In a wringer, the combination with a pair of cooperating rolls; of means for yieldingly forcing one of said rolls toward the other and limiting movement of said yieldingly forced roll toward said other roll; movable means for advancing and retracting said other roll to and from operative pressure-exerting position with respect to said yieldingly forced roll; main and auxiliary frames carrying said rolls respectively; means movably supporting one of said frames with respect to the other frame to permit movement of the roll carried by said movable frame away from operative position with respect to the roll carried by the other frame and remove the pressure between said rolls; yielding means for holding said movable means and the roll associated therewith in retracted position to provide clearance between said rolls during movement of said movable frame to return the roll carried thereby to operative position; and means actuated by rotation of said rolls for actuating said movable means to advance said other roll to operative pressure-exerting relation with respect to said yieldingly forced roll.

25. In a wringer, the combination with a pair of cooperating rolls; of displaceable means for supporting one of said rolls, said displaceable means being movable to and away from a position in which said rolls cooperate; safety release means for maintaining said displaceable means in a position in which said rolls cooperate; advancing and retracting means for forcing the other roll into operative engagement with the roll carried by said displaceable means and for separating said rolls to provide clearance therebetween during movement of said displaceable means away from a position in which said rolls cooperate; and means for maintaining the roll which is carried by said displaceable means under yielding pressure while operatively engaged by said other roll.

26. In a clothes wringer the combination of a lower frame, a relatively movable upper frame, mechanism including a quickly releasable safety latch for releasably securing said upper frame to the lower frame, an upper roll, a spring mounted in the upper frame for stressing said upper roll downwardly, a lower roll mounted in the lower frame, and quick throw lever mechanism for raising said lower roll into pressure relationship with the upper roll or lowering it away from such pressure relationship.

27. In a clothes wringer, a pair of cooperative rolls, a lower frame, a relatively movable upper frame, means releasably holding said frames against relative movement, resilient means supported on the upper frame normally urging the upper roll into pressure contact with the lower roll, and dual position cam means supporting the lower roll and operable to quickly drop the lower roll from pressure relationship or raise the lower roll into pressure contact with the upper roll.

28. In a clothes wringer, a frame including relatively movable upper and lower frame sections, quick release means for releasably connecting said frame sections against relative movement, cooperative wringer rolls mounted on said frame, spring means urging said rolls into pressure relationship, roll bearings slidably mounted in the lower frame, a cam shaft rotatably mounted in and extending longitudinally of the lower frame, cams rigidly secured and rotatable with said shaft and directly supporting the lower roll bearings, and means attached to said shaft and operable to release roll pressure, or restore roll pressure while said frame sections are operatively connected by said quick release means.

29. In a clothes wringer the combination of a lower frame, an upper frame, an upper roll mounted in bearings supported in said upper frame by a pressure spring and pressure adjustment screw, means to releasably attach the upper frame to the lower frame, a lower roll mounted in the lower frame on quick throw cams actuated by a cam shaft, and a lever mounted on the end of said cam shaft whereby the lower roll may be lowered away from or raised into pressure contact with the upper roll.

30. In a clothes wringer the combination of a lower frame, an upper frame releasably attached to the lower frame by mechanism including a quickly releasable safety latch, an upper roll stressed downwardly by a spring mounted in the upper frame, and a lower roll mounted in the lower frame on quick throw lever mechanism whereby said roll may be raised into pressure relationship with the upper roll or lowered away from such pressure relationship.

31. In a clothes wringer, a lower frame, an upper frame releasably mounted on the lower frame, an adjustment screw in the upper frame, a pressure spring supported by said screw, roll bearings supported by the pressure spring, an upper roll mounted in said bearings, a quick throw cam shaft supported in and extending through the lower frame, roll bearings supported on said cams, a lower roll mounted in said bearings, and a lever on the end of said cam shaft whereby the lower roll may be raised for pressure contact with the upper roll or lowered from such pressure contact to permit easy attachment of the upper frame with the lower frame and adjustment of the spring pressure.

32. In a clothes wringer, a lower frame, an upper frame releasably attached to the lower frame, an upper roll adjustably spring mounted on the upper frame, a lower roll mounted in bearings movable vertically in the lower frame, and quick throw cam means supporting said bearings operable by a lever whereby the lower roll may be raised for pressure contact with the upper roll or lowered to separate the rolls to permit easy pressure-free attachment of the upper frame and roll pressure adjustment.

SIMON E. SCHROEDER.

CERTIFICATE OF CORRECTION.

Reissue No. 21,895. September 2, 1941.

SIMON E. SCHROEDER.

It is hereby certified that error appears in the printed specification of the above numbered patent requiring correction as follows: Page 5, second column, line 24, claim 17, for "second means" read --second named means--; and that the said Letters Patent should be read with this correction therein that the same may conform to the record of the case in the Patent Office.

Signed and sealed this 14th day of October, A. D. 1941.

Henry Van Arsdale,
Acting Commissioner of Patents.

(Seal)